INVENTORS.
J. P. GREENING
R. A. DOUBT
BY Young + Quigg
ATTORNEYS

Dec. 21, 1965   J. P. GREENING ETAL   3,225,327
ROTATIONAL SEISMOMETER
Filed March 16, 1962   2 Sheets-Sheet 2

INVENTORS.
J. P. GREENING
R. A. DOUBT
BY
Young & Quigg
ATTORNEYS

United States Patent Office 3,225,327
Patented Dec. 21, 1965

3,225,327
ROTATIONAL SEISMOMETER
John P. Greening and Ralph A. Doubt, Bartlesville, Okla., assignors to Phillips Petroleum Company, a corporation of Delaware
Filed Mar. 16, 1962, Ser. No. 180,098
2 Claims. (Cl. 340—17)

This invention relates to the measurement of vibrations which occur in preselected directions.

In geophysical prospecting, it is common practice to detonate an explosive charge at a first location near the surface of the earth. This establishes vibrations which travel downwardly through the earth and which are reflected or refracted back toward the surface. A plurality of seismometers are located in spaced relationship from the shot point to detect these vibrations. In many operations, the seismometers are responsive to all of the vibrations which are received at the seismometer locations. The detected vibrations thus include those which have traveled through the earth and are reflected or refracted back from subterranean formations. However, the seismometers also receive waves which are propagated along the surface of the earth directly from the shot point. Since these surface waves are superimposed upon the desired signals, it is often difficult to interpret the records so as to distinguish the desired vibrations from the undesired surface waves.

In United States Patent 2,657,373 to R. G. Piety, there is disclosed a system for eliminating the effect of ground waves in seismic records. This is accomplished by employing two separate seismometers at each location which receives vibrations. One of these seismometers is responsive solely to ground waves which tend to impart a rotational movement. The output of this seismometer is combined with the output of a conventional seismometer in such a manner as to minimize the effect of the ground waves in the resulting composite record.

In accordance with the present invention, there is provided an improved rotational seismometer which is responsive to vibrations in a preselected plane. This seismometer comprises a member which is pivoted so as to be free to rotate in a housing. When vibrations are received by the housing, the housing is displaced in the direction of the vibrations. However, the member tends to remain stationary because of its inertia. One end of this member supports a series of capacitor plates which are mounted in spaced relationship with a second series of capacitor plates that are carried by the housing. Vibrations received by the housing thus vary the spacings between the capacitor plates to change the capacitance. A damping means is secured to the member to reduce relative movement between the member and the housing after the vibrations are received.

Accordingly, it is an object of this invention to provide improved apparatus for measuring vibrations in a predetermined direction.

Another object is to provide a rotational seismometer which is rugged in construction, reliable in operation, can readily be adjusted, and is economical to manufacture.

Other objects, advantages and features of the invention should become apparent from the following detailed description, taken in conjunction with the accompanying drawing in which.

Figure 1:
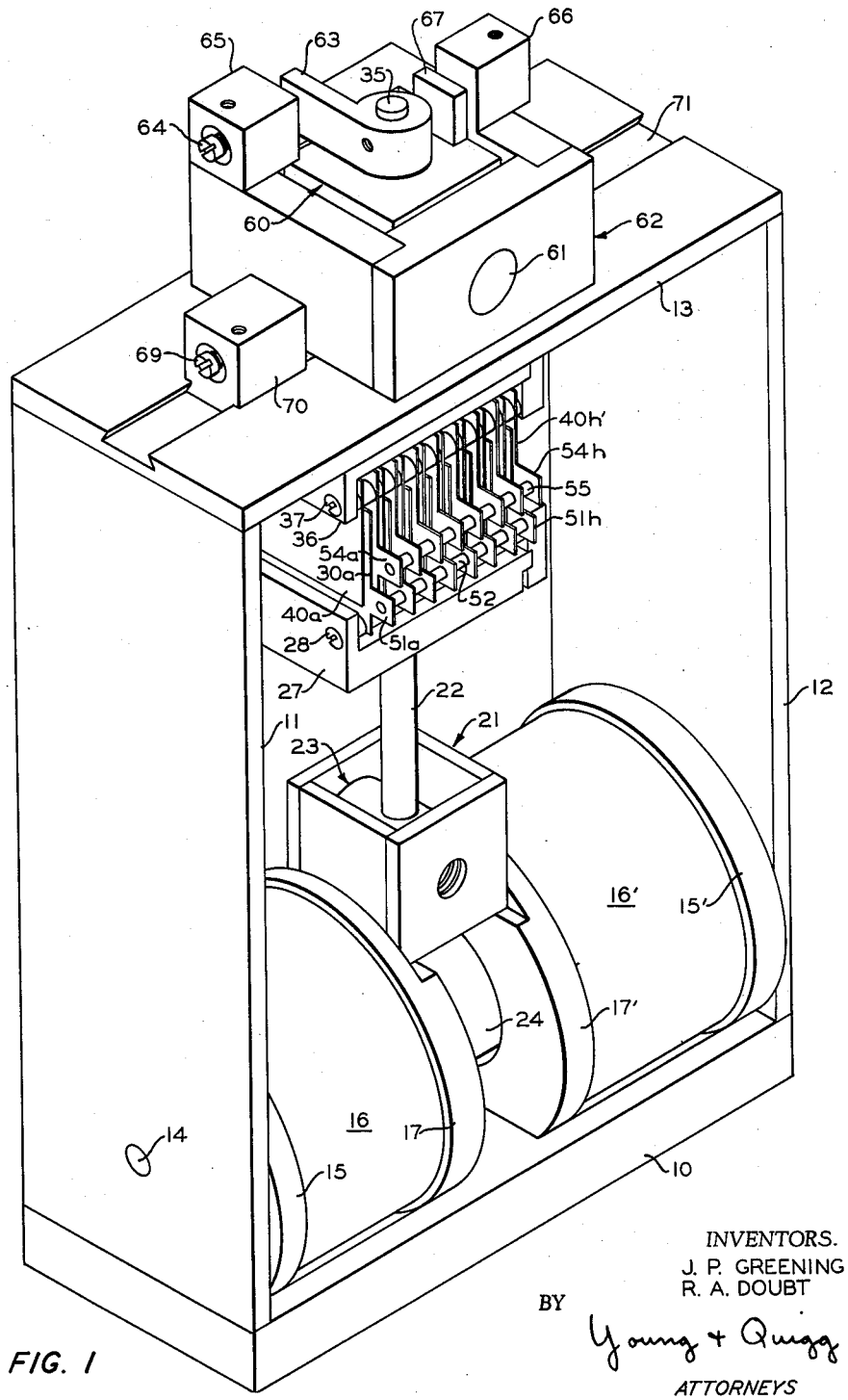
FIGURE 1 is a perspective view of the rotational seismometer of this invention.

Referring now to the drawing in detail and to FIGURE 1 in particular, there is shown a base 10 which is adapted to be positioned on the earth or other surface, displacement of which is to be measured. Base 10 supports spaced sidewalls 11 and 12 which in turn support a top plate 13. Base 10, sidewalls 11 and 12 and top plate 13 thus form a housing for the seismometer. As illustrated in detail in FIGURE 2, a rod 14 extends between walls 11 and 12. A first circular plate 15 is mounted on rod 14 adjacent wall 11 and rests on base 10. A hollow cylindrical magnet 16 is secured to plate 15. An annular plate 17 is secured to the end of magnet 16 opposite plate 15. A hollow cylinder 18 is mounted on rod 14 in the center of magnet 16. Plates 15 and 17 and cylinder 18 are formed of a magnetic material, such as soft iron, so that the magnetic field established by magnet 16 extends across and is concentrated between an air gap 20 between cylinder 18 and plate 17.

A second magnetic assembly identical to the one thus far described is mounted on rod 14 adjacent wall 12. The elements of this assembly are indicated by corresponding primed reference numerals.

Figure 2:
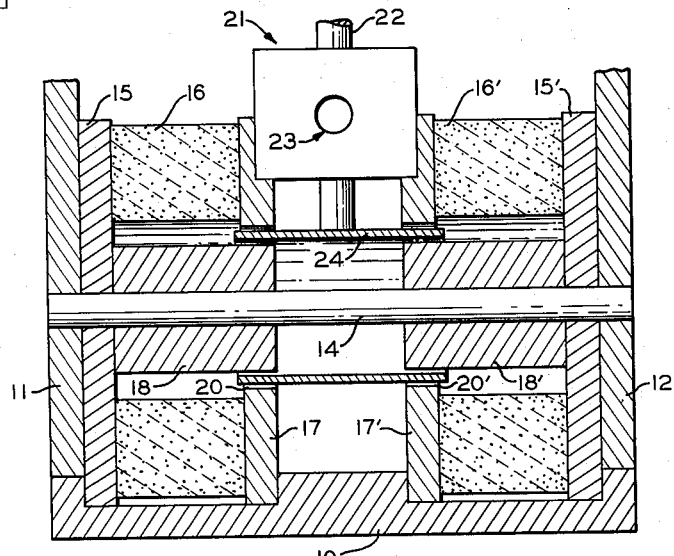
FIGURE 2 is a view, shown partially in section, of the damping mechanism connected to the rotational member of the seismometer.

A hollow frame assembly 21 is mounted on plates 17 and 17' between walls 11 and 12. A rod 22 extends through this assembly and is pivotally attached thereto by a pivot support 23. This pivot support can advantageously be a pair of flexure plates of the type described in Publication No. OOU-6-613A of the Bendix Corporation, Utica, New York. As illustrated in FIGURE 2, rod 22 is free to rotate about pivot 23 in the plane of the drawing. It is generally desirable that the rod assembly be pivoted at its center of gravity. The lower end of rod 22 supports a hollow metallic electrically conductive cylinder 24 which extends into air gaps 20 and 20'. Any rotation of rod 22 about pivot point 23 is thus damped by the movement of cylinder 24 in the magnet fields established by magnets 16 and 16'.

Figure 3:
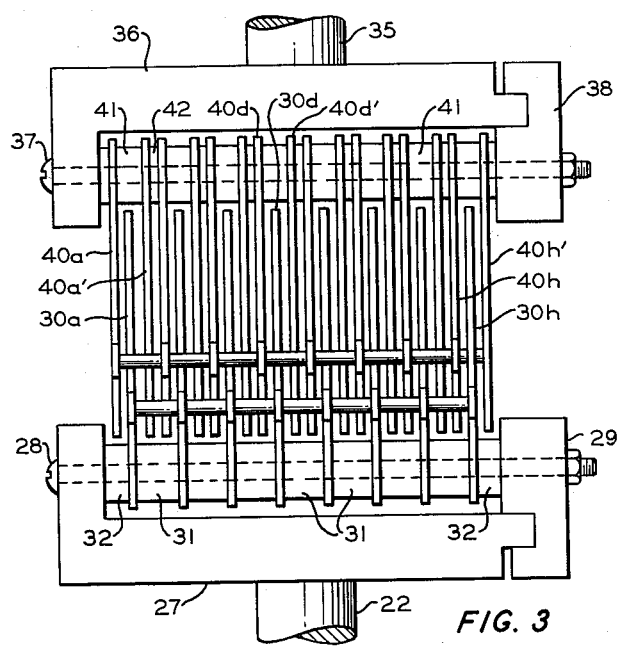
FIGURE 3 is a view showing details of construction and assembly of the capacitor plates of the seismometer.

As illustrated in FIGURES 1 and 3, a rectangular base 27 is attached to the upper end of rod 22. A bolt 28 extends from the end of base 27 above the surface thereof to an end plate 29. This bolt supports a plurality of generally rectangular capacitor plates 30a to 30h. These capacitor plates are held in spaced relationship with one another by insulating sleeve 31 on bolt 28. Sleeves 32 extend between the end capacitor plates and respective elements 27 and 29. Although not shown in the drawing, a second bolt assembly supports the back edges of the capacitor plates on base 27 in the same manner.

A rod extends downwardly through plate 13 and carries a support 36 at its lower end. A bolt 37 extends from the end of support 36 to an end plate 38. Bolt 38 carries a plurality of pairs of spaced capacitor plates which surround each of the first capacitor plates 30a to 30h. For example, plates 40a and 40a' are positioned on opposite sides of plate 30a. These pairs of capacitor plates are mounted in spaced relationship with one another on bolt 37 by insulating sleeves 41 and 42. Of course, the number of capacitor plates employed is a function of the sensitivity desired by the apparatus.

When the apparatus of this invention is employed to detect seismic vibrations, base 10 is positioned on the surface of the earth. Any ground waves which are received by the seismometer tend to tip base 10 when walls 11 or 12 are pointed in the general direction of the vibration source. This rotational movement is imparted to the magnetic assemblies secured to base 10 and to the capacitor plates which are carried by support 36. However, rod 22 and the elements carried thereby tend to remain stationary because of the inertia of the assembly. Thus, relative movement between the two groups of capacitor plates occurs such that plates 30a to 30h are moved toward one set of the adjacent second plates and away from the opposite set. As previously mentioned, this movement is retarded by the damping action of the magnetic fields in which cylinder 24 is disposed. In some operations, only one magnetic field is required to supply the desired damping.

Figure 4:
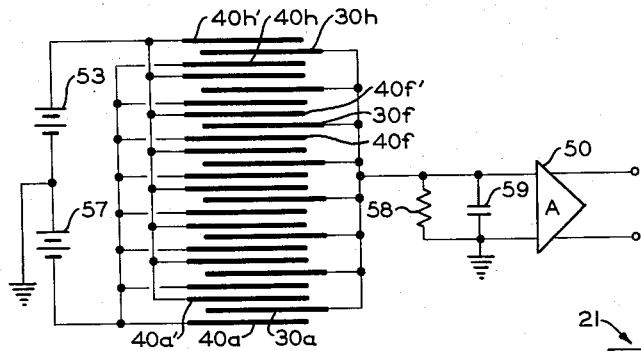
FIGURE 4 is a schematic drawing of a measuring circuit connected to the seismometer.

The relative movement of the capacitor plates can be detected by means of the circuit illustrated in FIGURE 4. Capacitor plates 30a to 30h are connected to one another and to the first input terminal of a high input impedance amplifier 50. As illustrated in FIGURE 1, these capacitor plates are provided with extending tabs 51a to 51h which are electrically connected to one another by conductive sleeves 52. Plates 40a to 40h are connected to one another and to the positive terminal of a voltage source 53. This connection is accomplished by respective tabs 54a to 54h, see FIGURE 1, which are connected to respective capacitor plates 40a to 40h. The tabs are connected to one another by conducting sleeves 55. In a similar manner, capacitor plates 40a' are connected to one another and to the negative terminal of a voltage source 57. The second end terminals of voltage sources 53 and 57 are connected to ground, as is the second input terminal of amplifier 50. Amplifier 50 is provided with an extremely high impedance input resistor 58 which is shunted by a capacitor 59. Capacitor 59 is actually the input capacitance of amplifier 50. The measuring circuit thus acts as an electrometer to detect changes in the spacing between the capacitor plates. Of course, other circuits can be employed to measure changes in capacitance of the condensers by relative movement between the plates thereof.

In order to obtain a seismometer which has high sensitivity, it is important that the initial position of the capacitor plates relative to one another be adjustable to obtain equal spacing initially. This is accomplished by means of the apparatus illustrated in FIGURE 1. Rod 35 extends upwardly through a frame 60 which is mounted on a rod 61 that is supported by a second frame 62. An arm 63 extends from the upper end of rod 22. A screw 64 is threaded into a support 65 which rests on frame 62. Screw 64 engages arm 63 such that rotation of the screw rotates rod 35. This in turn rotates the stationary capacitor plates relative to the movable plates which are supported by base 27.

A second screw, not shown, is threaded into the end of a support 66 which is carried by frame 62. The screw engages an extension 67 of frame 60 such that rotation of the screw pivots frame 60 about support rod 61. This imparts a rotational movement to the stationary capacitor plate assembly. A third adjustment of the assembly is provided by a screw 69 which is carried by a support 70 on plate 13. Screw 69 engages frame 62 such that rotation of screw 69 displaces the frame in a direction parallel to groove 71 in plate 13. This imparts a corresponding translational movement to the stationary capacitor plates. Thus, the stationary plates can be moved in several directions relative to the rotary plates carried by rod 22.

In view of the foregoing description, it can be seen that an improved rotational seismometer is provided in accordance with this invention. Reflected vibrations from subterranean formations have little or no effect on the seismometer because they tend to displace base 10 upwardly. Upward displacement, however, does not move the housing relative to rotatable rod 22.

While the invention has been described in conjunction with a presently preferred embodiment, it should be evident that it is not limited thereto.

What is claimed is:

1. A vibration responsive device comprising a housing; an elongated member; means pivotally securing said member at a point intermediate the ends thereof to said housing so that said member is free to rotate relative to said housing; a plurality of first capacitor plates secured to one end of said member in parallel spaced relationship with one another; an electrically conductive element secured to the second end of said member, said member being secured to said housing at the center of gravity of the assembly formed by said member, said first capacitor plates and said element; a plurality of pairs of second capacitor plates secured to said housing so that each pair of said second plates is parallel to and surrounds a respective one of said first plates and is spaced therefrom; means secured to said housing to form a magnetic field which extends across said conductive element so that rotation of said member relative to said housing is damped; and adjusting means securing said second plates to said housing so that the position of said second plates relative to said first plates can be varied, said adjusting means comprising means for displacing said second plates in a direction perpendicular to the plane thereof, means for rotating said second plates about a first axis parallel to the plane thereof and means for rotating said second plates about a second axis parallel to the plane therof and perpendicular to said first axis.

2. A vibration responsive device comprising a housing; first and second magnets secured to said housing; pole pieces of magnetic material secured to said magnets to form first and second annular air gaps spaced from one another and having a common axis; a support secured to said housing; a member pivotally secured to said support for rotational movement relative thereto; a plurality of first capacitor plates secured to one end of said member in parallel spaced relationship with one another; an electrically conductive hollow cylinder secured to the second end of said member to move through said air gaps when said member is rotated relative to said housing, said member being secured to said support at the center of gravity of the assembly formed by said member, said first capacitor plates and said cylinder; a plurality of pairs of second capacitor plates secured to said housing so that each pair of said second plates is parallel to and surrounds a respective one of said first plates and is spaced therefrom; and means secured to said housing to form a magnetic field which extends across said conductive element so that rotation of said member relative to said housing is damped.

References Cited by the Examiner

UNITED STATES PATENTS 2,659,064    11/1953    Piety _____ 340—17

FOREIGN PATENTS 509,783    7/1939    Great Britain.
682,944    11/1952    Great Britain.

BENJAMIN A. BORCHELT, *Primary Examiner.*

SAMUEL FEINBERG, CHESTER L. JUSTUS,
*Examiners.*